No. 868,785. PATENTED OCT. 22, 1907.
E. M. JOHNSON.
COMPOSITE PIPE.
APPLICATION FILED NOV. 13, 1905.

2 SHEETS—SHEET 1.

Witnesses
Cha. McC. Chapman
Grace L. Heasley

Inventor:
Eugene M. Johnson
By Attorney Edward S. Beach

No. 868,785. PATENTED OCT. 22, 1907.
E. M. JOHNSON.
COMPOSITE PIPE.
APPLICATION FILED NOV. 13, 1906.

2 SHEETS—SHEET 2.

Witnesses
Chas. M. C. Chapman
Grace L. Hearley

Inventor
Eugene M. Johnson
By Attorney Edward S. Beach

UNITED STATES PATENT OFFICE.

EUGENE MALCOLM JOHNSON, OF ALLSTON, MASSACHUSETTS.

COMPOSITE PIPE.

No. 868,785.  Specification of Letters Patent.  Patented Oct. 22, 1907.

Application filed November 13, 1905. Serial No. 287,199.

*To all whom it may concern:*

Be it known that I, EUGENE MALCOLM JOHNSON, a citizen of the United States, residing at Allston, in the county of Suffolk and State of Massachusetts, have invented certain new and useful Improvements in Composite Pipe, of which the following is a specification, reference being had therein to the accompanying drawing.

The object of my invention is to produce composite pipe of sheet metal and plastic material.

Figure 1:
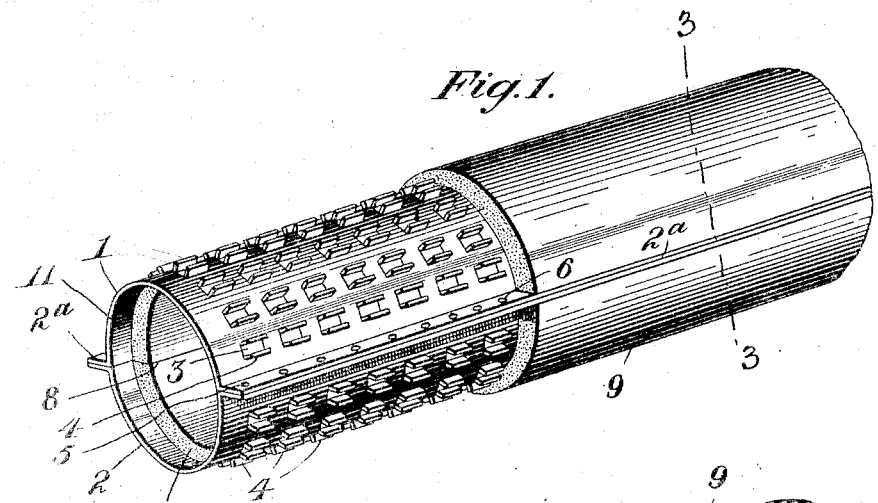
Figure 2:
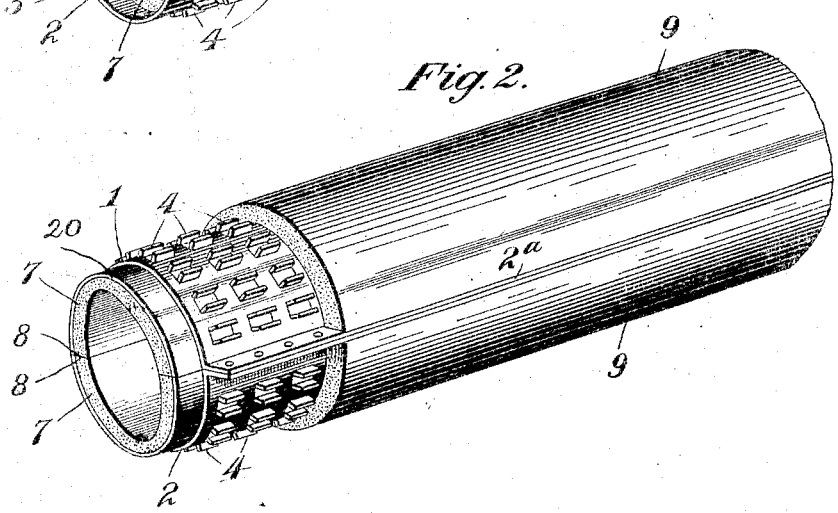
Figure 3:
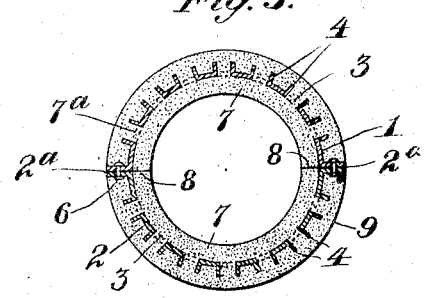
Figure 4:
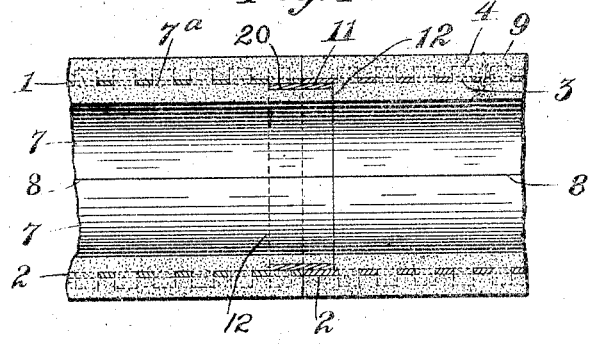
Figure 5:
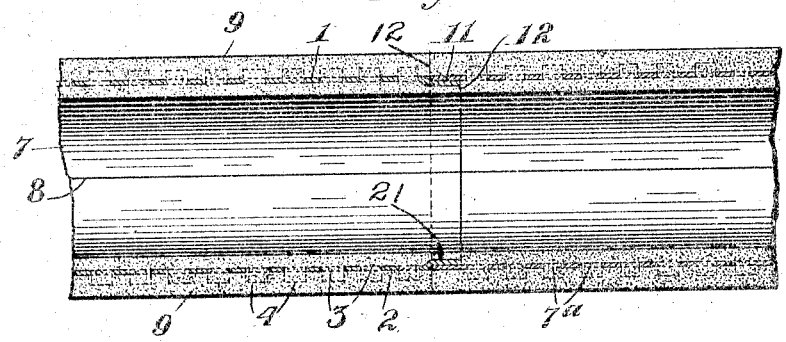

Figure 1 is a perspective view of a pipe constructed in accordance with my invention and partially covered on its outside with concrete or the like, and provided with an interior lining of concrete or the like. Fig. 2 is a perspective view of the foregoing, and shows a pipe coupling located in and projecting from one end of the pipe. Fig. 3 is a transverse section of a completed pipe section corresponding to line 3—3 of Fig. 1. Fig. 4 is a lengthwise central section of a pair of completed pipe sections united together by means of a coupling such as indicated in Fig. 2. Fig. 5 shows a modification in which a reduced end of the metal portion of one pipe section is socketed in the end of the connected pipe section.

In the drawings, 1 and 2 are complementary, sheet metal, pipe-sections, each hemispherical in cross-section and having flat integral ribs 2ª along their two sides. The pipe sections have holes 3 through them and integral, projecting ears 4. The ribs 2ª are smooth surfaced and formed with holes 5 for rivets, or the like. When a pair of pipe sections are placed, concave side towards concave side, and the opposed faces of the ribs brought together, the ribs are secured together by fasteners 6, and a strong sheet metal, pipe-like frame work produced. It is necessary, however, to line this framework with plastic compound, such as cement, concrete, "granolithic", or the like, before the pipe-sections are assembled, as shown in Fig. 2. Herein, the lining 7 has its edges 8 flush with the faces of the ribs 2ª; the plastic lining is anchored in place by passing through the holes (as indicated at 7ª) at which points it unites with the outer covering 9 which completely incloses the assembled pipe sections. When the ribs are brought face to face, the edges 8 are also brought into contact. The abutting edges 8, 8 are united, if the lining is still moist; if dry, by applying proper moist composition to the edges. In either of these ways, a liquid or gas-tight joint is formed at the junction of the edges 8, 8, and homogeneity given to the lining. The projections give additional anchorage to the lining over what the holes afford; and the lined shells or sections may be transported without the linings getting loose.

It is desirable to form the end margins of the pipe sections without projections and without holes and to connect the pipe sections together end-wise by lap jointing.

In Fig. 1 it will be seen that the end of lining 7 stops short of the end of the pipe section, so that the end of the pipe section is unlined annularly at 11. A convenient way of uniting two pipe sections is to insert a lined ring 20 into the free and unlined end 11 of a pipe section. The ring 20 may be made of two half-round members of metal as indicated in Fig. 2. The coupling 20 projects from the end of the pipe section into which it is inserted, and is adapted to receive the unlined end of a pipe section to be connected, as will be plain without further description. The lining of coupler 20 butt-joints at each end of the coupler with the thereto opposed ends of the linings of the pipe sections coupled together, and the opposed walls of the respective linings are homogeneously united by moistening them or by the use of a cement. The theoretical joints are indicated by 12 in Fig. 4.

In Fig. 5, showing a modification, the coupler 20 is dispensed with, and the reduced end 21 of one of the pipe sections is telescopically mounted in the end of the pipe section coupled thereto. In this case the lining of the pipe section having the reduced end 21 comes flush with the outer end of the section, the inner surface of the outer pipe section being formed with the unlined space 11 as in Fig. 1. Homogeneous joints are formed at 12—12 in this construction, these joints being theoretical and not existent in the completed pipe after the plastic material has hardened.

Ribs 2ª may be of any proper size, and in effect are ears, which preferably extend the whole length of each hemispherical pipe section at each edge thereof, as shown. I hereinafter refer to these ribs or ears as edge ears.

What I claim is:

A sheet metal pipe-forming frame comprising hemispherical sections each formed with outwardly-projecting edge ears which are fastened together to hold said sections pipe-wise; the pipe sections being formed with parallel rows of perforations at each of two opposite sides of which there is an outwardly projecting, integral ear; combined with an interior lining and an exterior covering, both of plastic material, which is united together through said perforations; said lining having length-wise edges jointed together opposite the edge ears of said frame, and the side edges of the covering of each member being supported on said edge ears and by said projecting ears at opposite sides of the perforations.

In testimony whereof I affix my signature in presence of two witnesses.

EUGENE MALCOLM JOHNSON.

Witnesses:
E. A. ALLEN,
EDWARD S. BEACH.